May 15, 1928.

W. L. HARTZELL

MOTOR CONTROL SYSTEM

Filed Sept. 12, 1921

WITNESSES:

INVENTOR
Walter L. Hartzell.
BY
ATTORNEY

Patented May 15, 1928.

1,669,558

UNITED STATES PATENT OFFICE.

WALTER L. HARTZELL, OF PITTSBURGH, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed September 12, 1921. Serial No. 499,946.

My invention relates to motor-control systems and it has particular relation to such systems of control as are employed in connection with the drilling of oil wells and the like.

One object of my invention is to provide a system of control which will insure the desired degree of flexibility in the performance of the various operations effected by well-drilling apparatus.

More specifically, an object of my invention is to provide means for simultaneously controlling two two-speed alternating current motors through one controller or for independently controlling the motors as desired.

Another object of my invention is to provide an arrangement for automatically effecting a gradual reduction in the speed of a "hoisting" motor substantially in proportion to increase of load.

A further object of my invention is to provide simple and effective overload protection for the motors, It is well known to those skilled in the art that various control systems have been employed for electric driving motors which, while more efficient in general than steam apparatus, have been found deficient in flexibility.

I propose to use two two-speed wound-rotor motors mechanically connected together for providing the maximum desirable range of speed control. For convenience, the two motors and control apparatus are duplicates. As required in the drilling operation, when the two motors are operating simultaneously, they are controlled in starting, stopping or reversing entirely by one controller. Changes in speed are effected by independent manipulation of the respective controllers. The distribution of the load between the motors is therefore equal or unequal, as desired, with corresponding effect upon the speed at which the mechanism is operated.

In hoisting sections of well-casing, the maximum motor speed is normally employed. However, in case of overload, due to a cave-in or other cause, it is desirable that the hoisting speed be reduced practically in proportion to the load and that, in case of dangerous overload, power will be cut off and the mechanical brake applied to the hoisting mechanism to prevent the casing from backing down the well. I provide suitable control for insuring proper slow-down operation and, in case the load is suddenly removed, the motor will again accelerate smoothly and without undue strain.

Figure 1 of the drawing is a diagrammatic view of circuits and apparatus embodying my invention.

Figure 1:
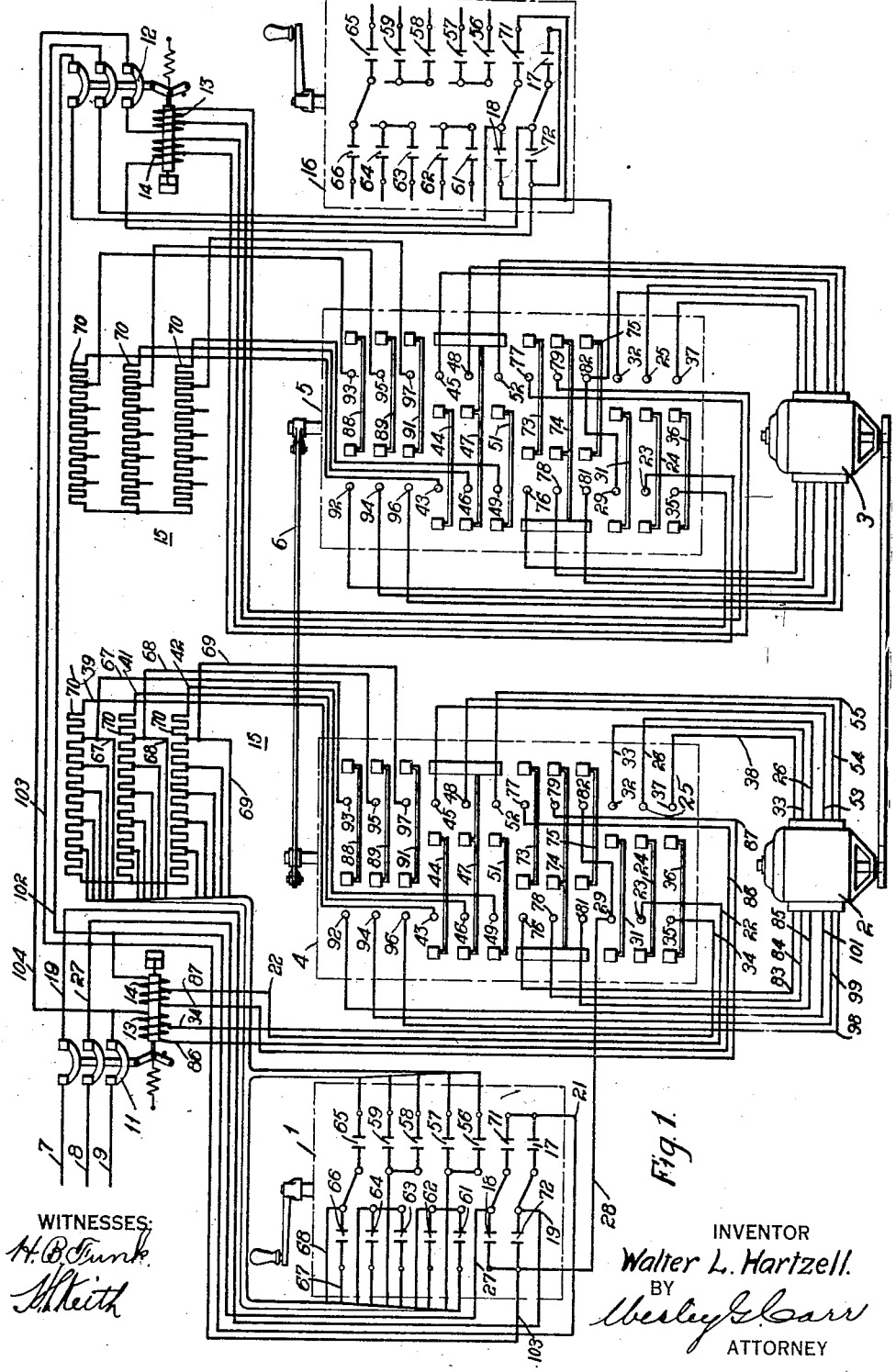

Referring particularly to Fig. 1, a master controller 1 of the type illustrated in U. S. Patent #1,362,003 controls alternating current motors 2 and 3 which may be belted together for driving a common load. Selective high or low speed connections are effected by means of pole-changer switches 4 and 5. These switches are mechanically interlocked and operated through a shipper rod 6. Connections to line conductors 7, 8 and 9 are effected through circuit breakers 11 and 12, having doubly-wound overload trip coils 13 and 14. Each motor is provided with a secondary resistor 15, the values of which are regulated respectively by controllers 1 and 16.

Figures 2, 3:
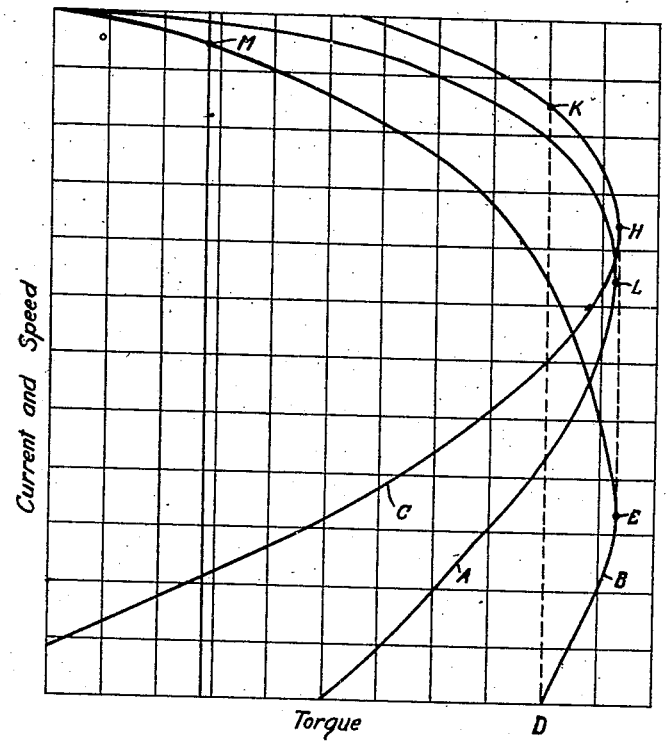
Fig. 2 illustrates curves representing the relations of current, speed and torque of the motor which I employ for hoisting.
Fig. 3 is a sequence chart indicating the several operating positions of the control switches.

The operation of the system employing motor 2 will first be described:

When it is desired to connect the motor for hoisting, the shipper rod 6 is moved to the right, effecting proper primary and secondary high-speed winding connections. Assuming that circuit breaker 11 has been closed manually, occupying the position shown in the figure, controller 1 is actuated in a forward direction (see sequence chart Fig. 3) to its first operative position, simultaneously effecting the closure of switches 17 and 18, through which power connections are completed with line conductors 7, 8 and 9 through the circuit breaker 11.

Power is supplied to the primary of the motor as follows: From line conductor 7 through circuit breaker 11, conductor 19, switch 17, conductor 21, a portion of coil 14, conductor 22, contact members 23, 24 and 25 to motor conductor 26. Power is supplied from line conductor 8 through circuit breaker 11, conductor 27, switch 18, conductor 28, and contact members 29, 31 and 32 to motor conductor 33. Power is supplied from line conductor 9 through circuit breaker 11, a portion of coil 13, conductor 34 and contact members 35, 36 and 37 to motor conductor 38.

Connections are established to secondary resistor 15, respectively, through conductors 39, 41 and 42 and through contact members 43, 44 and 45, 46, 47 and 48, and 49, 51 and 52 to secondary conductors 53, 54 and 55.

Controller 1, which is preferably of the cam type, is actuated in a forward direction to progressively effect the closure of switches 56, 57, 58, 59, 61, 62, 63, 64, 65, and 66 to accelerate the motor 2. In the final or normal operating position of the controller 1, switches 65 and 66 are closed to connect conductors 67, 68 and 69, thereby shunting secondary resistor 15 from circuit, with the exception of equal portions 70. The motor is now operating on curve "B" shown in Fig. 2, which is a graphic representation of the effect produced on the speed of the motor by the insertion of resistors 70 which are of such ohmic value as to insure the desired reduction in speed proportional to increased load. When exerting full load torque, the motor will attain a speed represented by the point "M", due to the external resistance. With an increasing load the motor speed is gradually reduced to a point "E", where it is called upon to exert its maximum torque. If the load imposed on the motor continues to increase, the speed is further reduced and the torque also is slightly reduced until zero speed is reached. If the motor is stalled for a predetermined period power will be cut off by the operation of circuit breaker 11. The action of the circuit breaker is delayed in a well known manner by means of a dashpot. If the motor is relieved of its overload before the operation of the circuit breaker it will again automatically accelerate without undue strain, following the curve "B" in proportion to the decrease in load.

The circuit breaker is set to open the power circuit at any desired current point between "H" and "K"; corresponding to points "D" and "E" on the torque curve "B". Therefore, should the overload continue with the motor stalled, the circuit breaker will operate to disconnect the motor.

Curve "C" is a representation of the well known relations of current and torque of the motor and which indicates the change in torque produced by increase or decrease in the value of the current admitted to the motor. Curve "A" represents normal speed-torque characteristics of the motor with no external resistance in circuit therewith. It is to be noted that with no external resistance in the motor circuit the speed is reduced slightly with increasing load to the "pull-out" point "L". From an inspection of the curve A it is apparent that if the load increases beyond point "L" the torque is reduced to about one-half the maximum value of which the motor is capable. Should the load be reduced to less than one-half the value at which maximum torque of the motor is exerted, the motor will again accelerate. The rate of acceleration will be extremely high since the motor is virtually thrown on the line without any secondary resistance in circuit, in contrast to the operation on curve "B" with resistor sections 70 in circuit.

For reversing the motor 2 the pole changer switch 4 remains in its present position when the controller 1 is reversed to open switches 17 and 18 and close switches 71 and 72, after which the operation is as previously described.

In changing from high-speed to low-speed connections, the controller 1 is returned to the "off" position, after which the pole-changer switch 4 is actuated by the shipper rod 6. The movement of the shipper rod 6 to the left opens the high speed pole changer connections previously traced and establishes low speed connections. Contact members 73, 74 and 75, respectively engage contact members 76 and 77, 78 and 79, and 81 and 82. The low-speed primary conductors 83, 84, and 85 now receive power when controller 1 is actuated as previously described for the high speed operation. Power is now supplied from line conductors 7, 8 and 9 to the entire windings of coils 13 and 14, which provide a circuit breaker setting suitable for low-speed operation. The primary circuit is completed through conductors 86 and 87 to the pole-changer switch 4. The secondary connections are established by the pole-changer contact members 88, 89 and 91, which respectively engage contact members 92 and 93, 94 and 95, and 96 and 97, thereby connecting secondary conductors 98, 99 and 101 with conductors 67, 68 and 69. Resistor sections 71, 72 and 73 are excluded from circuit. The controller 1 is actuated to shunt the sections of resistor 15 to accelerate the motor, as described for the high speed connections.

Motors 2 and 3, with their respective controllers, may be operated in parallel to supply necessary additional power, the functions and application of which are as described for the operation of a single motor. For drilling operations, when it is desired to simultaneously control both motors, circuit breaker 12 occupies its closed position shown in the figure. Power is supplied to motors 2 and 3 simultaneously upon closure of switches 17 and 18 for forward operation or 71 and 72 for reverse operation. The circuits for motor 2 are as previously described. The circuits for motor 3 are as follows: Power is supplied from line conductor 7 through circuit breaker 11, conductor 19, switch 17, conductor 21, conductor 102, through circuit breaker 12 to controller 16.

Power is supplied from line conductor 8 through circuit breaker 11, conductor 27, switch 18 and conductor 103 through circuit breaker 12 to the controller 16. Power is supplied from line conductor 9 through circuit breaker 11, conductor 104, through circuit breaker 12, to pole changer switch 5. Controller 16, in its first operative position, establishes primary circuit connections for motor 3. The starting, stopping and reversing of both motors are, however, controlled by controller 1 and circuit breaker 11. The drilling speed is adjusted by the independent manipulation of controllers 1 and 16 on points in advance of the first operating position, the speed changing in accordance with the division of load between motors 2 and 3.

For the operation just described, the pole-changer connections for motor 3 are similar to those for motor 2. The primary connections effected by the controller 16 are slightly changed, as shown, to establish non-reversing connections by means of switches 17, 18, 71 and 72.

To those familiar with the art it is at once apparent that the operating curve "B" has the most desirable characteristics for a hoisting application. In common practice, when operating on a curve similar to curve "A", it is necessary for the operator to exercise extreme care to eliminate sudden starting and stopping which are apt to strip the coupling threads and cause the casing to drop to the bottom of the well. This occurrence, in most cases, will ruin the well. Furthermore, the majority of operators are accustomed to steam engine drive, in which the speed characteristics are similar to the characteristic curve "B". The operator is able to judge the load according to the reduction in speed. This operation is not generally accomplished with electric motor drive and the "pull-out" point of the characteristic curve is reached at a comparatively high speed; the motor, consequently, is stopped without warning to the operator, necessitating immediate application of the mechanical brake. The characteristic curve may be altered to obtain maximum torque at zero speed, determining one definite current setting for the circuit breaker. It is preferred that maximum torque be exerted at slightly above zero speed, giving a wide range of circuit breaker setting.

I claim as my invention:

1. The combination with an alternating current motor having a high and a low speed winding, of a resistor for controlling the acceleration of the motor on either winding and for inherently effecting a gradual reduction in the speed of said motor with an increase of load and with a fixed value of the controlling resistance, when operating on the high speed winding, and a pole-changer for selecting the proper speed winding and for varying the effective value of said resistance.

2. The combination with an alternating current motor having a high and a low speed winding, of a resistor for controlling the acceleration of the motor on either winding and for inherently effecting a gradual reduction in the speed of said motor with an increase of load and with a fixed value of the controlling resistance, when operating on one of the speed windings, and a pole-changer for selecting the proper speed winding and for varying the effective value of said resistance.

3. The combination with an alternating current motor having a high-speed and a low-speed winding, of a resistor for controlling the acceleration of the motor on either of the speed windings, a controller therefor for connecting a portion of the resistor in circuit with one of said speed windings, in the normal operating position of the controller, to insure gradual automatic reduction in speed to a predetermined value proportional to an increasing load, and a pole-changer for selecting the proper speed winding and for controlling the effective value of said resistor.

4. The combination with a motor having a high-speed and a low speed winding, of means for selectively connecting the windings in circuit, means for controlling the acceleration of the motor, comprising a resistor section, effective during normal operation to insure a gradual reduction in speed to a predetermined value with a gradual increase in load and means comprising the first named means for rendering said resistor section ineffective when said low speed winding is effective.

In testimony whereof, I have hereunto subscribed my name this 26th day of August, 1921.

WALTER L. HARTZELL.